M. E. WILSON.
VALVE OPERATING-DEVICE.
APPLICATION FILED MAR. 13, 1919.
1,324,947.
Patented Dec. 16, 1919.
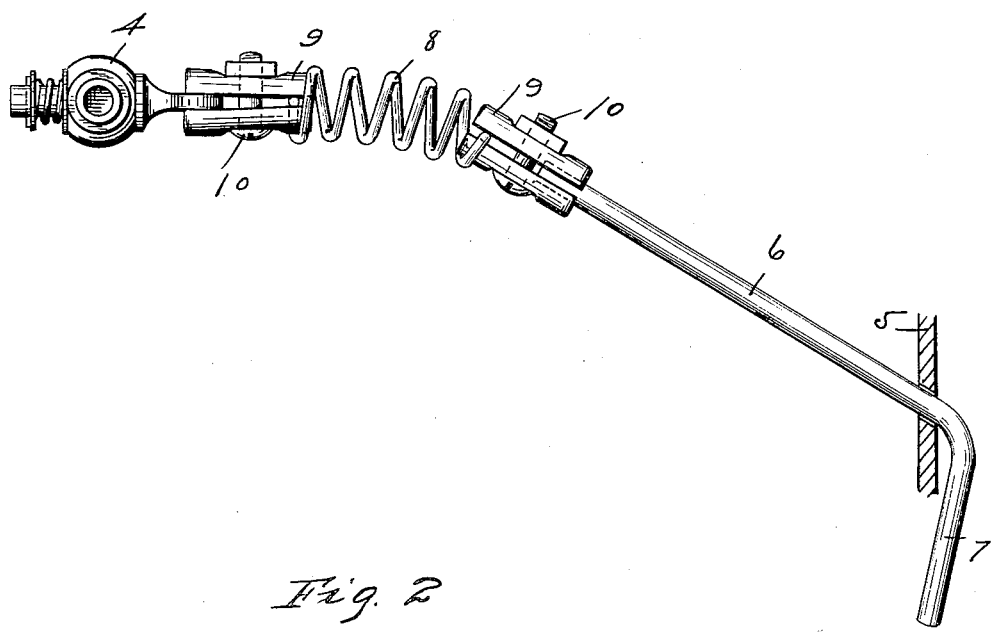
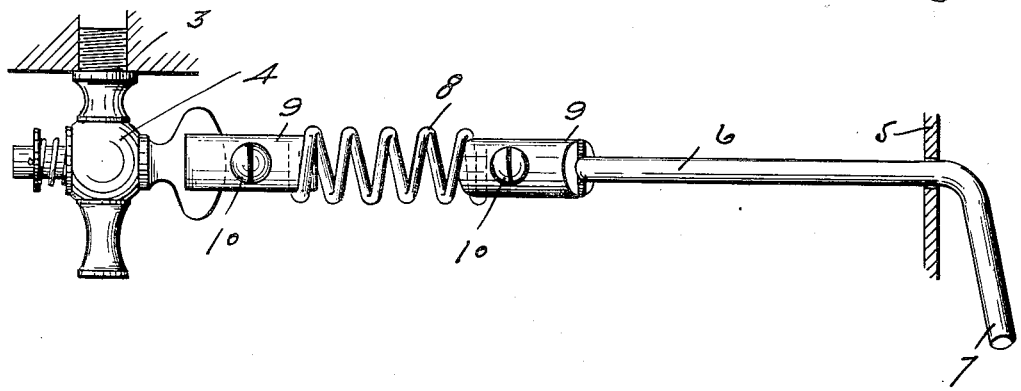
Inventor
Merit E. Wilson
By his Attorneys

UNITED STATES PATENT OFFICE.

MERIT E. WILSON, OF WATERTOWN, SOUTH DAKOTA.

VALVE-OPERATING DEVICE.

1,324,947.  Specification of Letters Patent.  Patented Dec. 16, 1919.

Application filed March 13, 1919. Serial No. 282,481.

*To all whom it may concern:*

Be it known that I, MERIT E. WILSON, a citizen of the United States, residing at Watertown, in the county of Codington and State of South Dakota, have invented certain new and useful Improvements in Valve-Operating Devices; and I do hereby declare the following to be a full, clear, and exact description of the invention, such as will enable others skilled in the art to which it appertains to make and use the same.

My invention has for its object to provide a valve operating device; and, to this end, it consists of the novel devices and combinations of devices hereinafter described and defined in the claims.

In the accompanying drawings, which illustrate the invention, like characters indicate like parts throughout the several views.

Referring to the drawings,

Figure 1 is a view of the invention in elevation; and

Fig. 2 is a plan view of the same.

The numeral 3 indicates the engine crank case of an automobile having two vertically spaced and horizontally disposed petcocks 4, only one of which is shown, and which petcocks are for the well known purpose of determining the amount of oil in the crank case, and the numeral 5 indicates the guard between the running board and body.

To open and close the petcock 4, without having to reach under the car, there is extended through a bore in the guard 5 an operating rod 6, the outer projecting end of which is bent to afford a hand piece 7. The other or inner end of the operating rod 6 is connected to the finger piece of the petcock 4 by a coiled spring 8, which serves as a universal joint and also permits vibratory movement of the crank case 3, with respect to the guard 5. A pair of clamps 9 detachably connect one end of the spring 8 to the operating rod 6 and the other end thereof to the finger piece of the petcock 4. Each clamp 9 comprises two members intermediately connected by a nut-equipped bolt 10 by which the members of the clamp may be frictionally clamped onto the parts held thereby.

While the invention is shown as applied to an automobile, it is, of course, understood that the same may be used for opening petcocks or valves having rotary members from a distant point and located in places where access is difficult. The spring not only acts as a universal joint, which permits the operating rod to extend at an angle to the rotary member of the petcock or valve to which it is applied, but it will yield to permit endwise movement of the operating rod without disturbing the petcock or valve.

The invention, while extremely simple and of small cost to manufacture, has, in actual usage, proven highly efficient for the purpose had in view.

What I claim is:—

1. The combination with a valve having a rotary member, of a hand piece, a coiled spring interposed between said rotary valve member and hand piece to afford a universal joint, and clamps connecting one end of said spring to the rotary valve member and the other end of said spring to the hand piece.

2. The combination with a valve having a rotary member, of a hand piece, a coiled spring having its ends bent radially thereacross, said spring being interposed between said rotary valve member and hand piece to afford a universal joint, and clamps extending into said spring engaging the bent ends thereof and connecting, the one to said rotary valve member and the other to the hand piece.

In testimony whereof I affix my signature in presence of two witnesses.

MERIT E. WILSON.

Witnesses:
D. W. STEELE,
ED SKELLS.